UNITED STATES PATENT OFFICE.

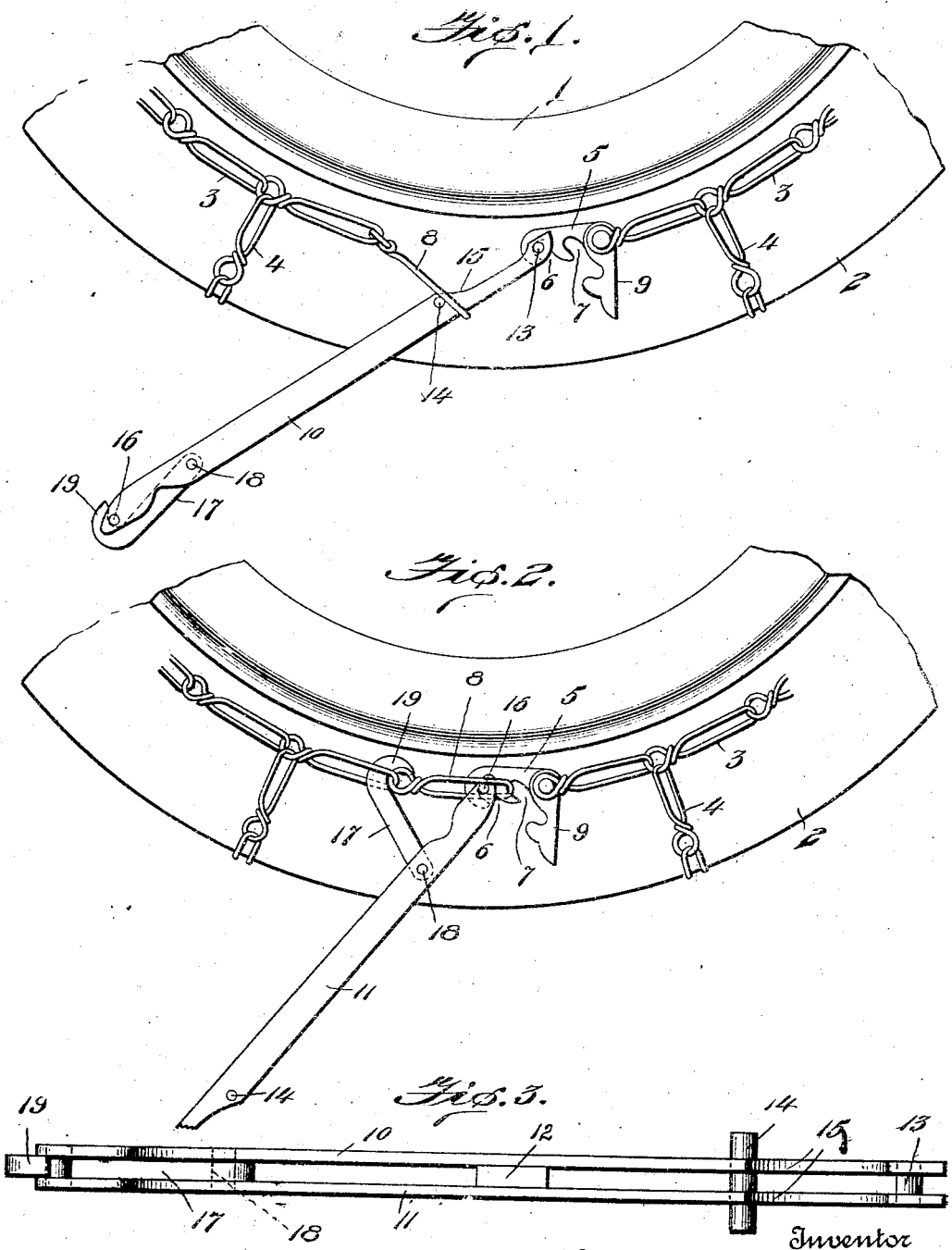

WALTER FEATHERINGILL, OF SAN DIEGO, CALIFORNIA.

COMBINATION-TOOL FOR USE IN APPLYING AND REMOVING ANTISKID CHAINS.

1,150,260.

Specification of Letters Patent.   Patented Aug. 17, 1915.

Application filed January 17, 1914.  Serial No. 812,847.

*To all whom it may concern:*

Be it known that I, WALTER FEATHER-INGILL, a citizen of the United States, and resident of San Diego, San Diego county, State of California, have invented certain new and useful Improvements in Combination-Tools for Use in Applying and Removing Antiskid Chains, of which the following is a specification.

This invention relates to a device for use in connecting and disconnecting the ends of the anti-skid chains such as are commonly used on automobile wheels.

It has been my object to make a device for this purpose which shall be simple and strong in construction, which can be cheaply made, and which can be operated by anyone with ease to connect and disconnect the ends of the chains in applying them to the wheel.

The novel features of the invention will be apparent from the following description, taken in connection with the drawings.

In the drawings, Figure 1 is a side view of a portion of the wheel showing my device in use when connecting the ends of the chain; Fig. 2 is a similar view showing the device in use in disconnecting the ends; and Fig. 3 is an edge view of the device at right angles to the view shown in the other figures.

In the drawings, I have shown a rim 1 of a wheel to which is applied any usual rubber tire 2, and I have shown the usual chain 3 extending around the tire on the side and it will be understood that there is a similar chain on the opposite side of the tire. The cross chains 4 connect the two side chains and extend around the outer edge of the tire at intervals. The chain has on one end a hook member 5 which has on one face the two notches 6, 7 forming two hooked members to be engaged by the link 8 on the opposite end of the chain.

9 represents a sheet metal housing adapted to fit over the hook, being U-shaped in cross-section, and its purpose being to hold the link of the chain in place in the hook. It will, of course, be understood that in order to remove the chain from the wheel it is necessary to disconnect the ends of the chain 3, and in applying the chain to the wheel it is necessary to pull the ends of the chain 3 together, bringing the link 8 into engagement with the hook and if this is done by hand it is often an awkward and difficult thing to do since the chain must be made reasonably tight.

My invention embodies a simple implement which occupies very little space in the tool-kit of the automobile owner, and which can be used after the chain is laid in place on the wheel to draw the ends together with ease making the link enter the hook and which can also be used for tightening the chain so as to loosen the link in the hook so as to permit it to be disconnected.

In the particular form shown my device consists of a body member made up of two parallel flat bars 10 and 11 which may be spaced apart at any suitable point by spacing means such as the block 12. The space between the side bars is just wide enough to permit the hook 5 to enter easily between them, and the ends of the two bars are not too wide to enter freely within the end of the link 8. At one end of the member, a cross-pin 13 connects the two bars and it is adapted to enter the hook as shown in Fig. 1. A cross-pin 14 also extends through the two side bars at some distance from the end and those pins project outwardly from the member so that they will serve as stops when the end of the member is inserted through the link 8, the sides of the link striking against the projecting ends of the pin 14. The bars 10 and 11 are preferably cut away on one side 15 between the pins 13 and 14, as shown in Fig. 1, and the opposite sides of the bars are cut away on a curve around the end of the pin 13 at the end of the member. It is believed that the operation of this part of the device will be apparent from the disclosure in Fig. 1. The end carrying the pin 13 is inserted through the link 8, that link dropping back against the pins 14, and the end is then made to straddle the hook 5 with the pin 13 entering the notch 6 in the hook. The operator then turns the device to the right in Fig. 1, so as to bring the link and hook together, and after the member has passed the position radial to the wheel the link 8 will slide down the face of the two bars and will enter the notch 7 of the hook. The housing or keeper 9 is then closed and the chain is secured in place. At the opposite end of the two bars from that above described, a cross-pin 16 is placed connecting the two side bars and adapted to engage the hook which enters between the two side bars at that end. At some distance from the end an arm 17 extends between the two side bars and is pivotally connected to those bars by a pin 18. This arm has on its end a hook 19 which is adapted to engage one of the links of the chain as shown in Fig. 2. The side of the two bars between the pins 16 and 18 is preferably cut away on one side, and on the opposite side the end is cut away around the pin 16.

In operation, in removing the chain from the wheel, the keeper or housing 9 is first turned back to the position as shown in Fig. 2 and the end carrying the pin 16 is made to straddle the hook with the pin entering the notch 6 and also entering the link 8 which passes along the sides of the hook through the notch 7. The arm 17 is then turned back and the hook 19 on its end is made to enter one of the links of the chain back of the link 8. The operator then turns the device from left to right, as shown in Fig. 2, the result being that the hook 5 and that portion of the chain to the left of the hook 19 will be drawn together and all strain on the link 8 will be removed and that link will simply fall out of the notch 7. The device is then turned back to the left and the link 8 will ride up the sides of the member, disconnected from the hook, and the member will then be moved to disengage the pin 16 from the hook and to disengage the hook 19 from the link.

It will be understood that my invention is not limited to the exact position of the pins nor to the shape of the bar, and that various changes may be made in the specific construction of the device without departing from the scope of my invention, as set forth in the claims.

Having thus described my invention, what is claimed is:

1. As a new article of manufacture, a device for applying anti-skid chains in connection with motor vehicle wheels comprising a lever, one end of which is adapted to be inserted through a link of the chain, a transverse pin in said end of the lever adapted to enter the hook member of the chain, and means on said lever acting as a stop engaging the link when the said end has entered the link a predetermined distance.

2. As a new article of manufacture, a combination tool for use in applying and removing anti-skid chains having a body member comprising two parallel flat bars spaced apart a sufficient distance to receive the hook of an anti-skid chain between them and capable of freely entering within the end of a link of the chain, and cross pins connecting the two bars one of said pins being located near the ends of the bars and adapted to enter the hook of the chain and the other pin being located at some distance from said end.

In testimony whereof I affix my signature in presence of two witnesses.

WALTER FEATHERINGILL.

Witnesses:
P. M. JOHNSON,
M. F. GRADY.